US006720812B2

(12) United States Patent
Tumer et al.

(10) Patent No.: US 6,720,812 B2
(45) Date of Patent: *Apr. 13, 2004

(54) MULTI-CHANNEL INTEGRATED CIRCUIT

(75) Inventors: Tumay O Tumer, Riverside, CA (US); Gerard Visser, Bloomington, IN (US)

(73) Assignee: Nova R&D, Inc., Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/279,004

(22) Filed: Oct. 24, 2002

(65) Prior Publication Data

US 2003/0141906 A1 Jul. 31, 2003

Related U.S. Application Data

(63) Continuation-in-part of application No. 09/592,264, filed on Jun. 13, 2000, now Pat. No. 6,333,648, which is a continuation-in-part of application No. 08/866,117, filed on Jun. 27, 1997, now Pat. No. 6,150,849, which is a continuation-in-part of application No. 08/460,489, filed on Jun. 2, 1999, now Pat. No. 5,696,458.
(60) Provisional application No. 60/330,596, filed on Oct. 25, 2001.

(51) Int. Cl.[7] .......................... H03B 17/00; G06F 11/00
(52) U.S. Cl. ............................ 327/170; 327/51; 327/69
(58) Field of Search ............................... 327/50, 69, 70, 327/71, 51, 58, 18, 80, 94

(56) References Cited

U.S. PATENT DOCUMENTS

| 3,430,197 A | 2/1969 | Brown ........................ 327/58 |
|---|---|---|
| 3,740,760 A | 6/1973 | Johnson ...................... 347/168 |
| 3,863,056 A | 1/1975 | Klein ....................... 324/140 R |
| 3,900,744 A | 8/1975 | Lammers ...................... 327/58 |
| 4,131,798 A | * 12/1978 | Reddy et al. ................ 250/328 |
| 4,556,982 A | 12/1985 | Dunn .......................... 375/10 |
| 4,857,737 A | * 8/1989 | Kamae et al. ......... 250/370.09 |
| 5,696,458 A | 12/1997 | Tumer et al. .................. 327/69 |
| 5,943,388 A | * 8/1999 | Tumer ....................... 378/98.9 |
| 6,150,849 A | 11/2000 | Tumer ........................ 327/70 |
| 6,333,648 B1 | 12/2001 | Tumer ........................ 327/70 |

OTHER PUBLICATIONS

Kravis, Scott D., et al., "Test Results of the Readout Electronics for Nuclear Applications (RENA) Chip Developed for Position–Sensitive Solid State Detectors," *SPIE* (Society of Photo–Optical Instrumentation Engineers), vol. 3445, Jul. 1998, pp. 374–382.

(List continued on next page.)

*Primary Examiner*—Dinh T. Le
(74) *Attorney, Agent, or Firm*—Snider & Associates; Ronald R. Snider

(57) ABSTRACT

A multi-channel integrated circuit is provided in which each channel has an analog section and a digital section. Each channel of the readout chip employs low noise charge sensitive amplifier at its input followed by other circuitry such as shaper, pole-zero, peak hold, different comparators, buffers and digital control and readout. Each channel produces a self-trigger and a fast timing output. Channel-to-channel time differences are also recorded. Integrated circuit also provides a large dynamic range to facilitate large range of applications. The trigger threshold can be adjusted to provide energy discrimination. The chip has different, externally selectable, operational modes including a sparse readout mode in which only the channels which have received signals greater than a preselected threshold value are read out. The sparse readout mode results in increased data throughput, thus providing fast data acquisition capabilities.

19 Claims, 12 Drawing Sheets

OTHER PUBLICATIONS

Kravis, Scott D., et al., "A multichannel readout electronics for nuclear application RENA) chip developed for position sensitive solid state detectors," *Nuclear Instruments & Methods in Physics Research*, A 422, 1999, pp. 352–356.

Mainprize, James G., et al., "Image Quality of a Prototype Direct Conversion Detector for Digital Mammography," *Society of Photo–Optical Instrumentation Engineers*, 1999.

He, Z., et al., "3–D position sensitive CdZnTe gamma–ray spectrometers," *Nuclear Instruments & Methods in Physics Research*, A 422, 1999, pp. 173–178.

Matteson, James L., "Position–sensitive CZT detector module," *SPIE* (Society of Photo–Optical Instrumentation Engineers), vol. 3446, Jul. 1998, pp. 192–201.

Yasillo, Nicholas J., et al., "Design Considerations for a Single Tube Gamma Camera," *IEEE Transactions on Nuclear Science*, vol. 37, No. 2, Apr. 1990, pp. 609–615.

Bird, A.J., et al., "Images obtained with a compact gamma camera," *Nuclear Instruments & Methods in Physics Research*, A 499, 1990, pp. 480–483.

Holl, P., et al., "A Double–sided Silicon Strip Detector with Capacitive Readout and a New Method of Integrated Bias Coupling," *IEEE Transactions on Nuclear Science*, vol. 36, No. 1, Feb. 1989, pp. 251–255.

Hall, G., "Silicon Drift Chambers," *Nuclear Instruments & Methods in Physics Research*, A 273, 1988, pp. 559–564.

* cited by examiner

MULTI-CHANNEL INTEGRATED CIRCUIT

This application is a continuation-in-part application of provisional application Ser. No. 60/330,596 filed Oct. 25, 2001. It is also a continuation-in-part to the previous applications 08/460,489 filed Jun. 27, 1997, 09/592,264 filed Jun. 13, 2000, now U.S. Pat. Nos. 5,696,458, 6,150,849 and 6,333,648 respectively by the inventor. The entire disclosure of those related applications are incorporated herein by reference for all purposes.

GOVERNMENT RIGHTS NOTICE

There are no government rights on this patent application.

FIELD OF THE INVENTION

There is need for high spatial and energy resolution x-ray, gamma ray and particle detectors. Scintillation counters read out by individual photomultiplier tubes has limitations in both spatial and energy resolution. Therefore, there is need for high resolution imaging solid state sensors, as increasingly sophisticated and higher resolution detectors are needed. These new imaging sensors with large number of channels require monolithic, compact, low noise and multi-channel integrated circuits for reading out the sensors. The integrated circuit needs to be capable of matching the energy resolution coming from the detectors. A new low noise multi-channel integrated circuit has been developed which can read out high-resolution, position-sensitive sensor arrays. The developed integrated circuit has low noise, an accurate timing output and a wide dynamic range. The new integrated circuit can be used in astrophysics, nuclear medicine and physics, radiography, security, medical and industrial imaging.

The technical viability of this approach has already been demonstrated by NOVA R&D, Inc., through its current RENA (Readout Electronics for Nuclear Application) chip which has been used successfully with CdZnTe (CZT), CdTe, GaAs, Si, and Si(Li) detectors as well as gas microstrip detectors. The new ASIC is called RENA-2 and it is a major advancement over RENA.

The demand for high-performance integrated, multichannel front-end and readout electronics is commensurate with the increasingly stringent detection requirements of many NASA missions and experiments. Important instrumentation segments that the developed ASIC hopes to serve are those of advanced hard x-ray and gamma-ray telescopes and x-ray and gamma ray astrophysics in general. Certain experiments in cosmic ray astrophysics would also benefit from specific design features of the new ASIC (Application Specific Integrated Circuit).

This ASIC can be used in NASA missions such as the planned Advanced Compton Telescope (ACT), a high-priority space-based instrument, is intended to achieve significantly enhanced sensitivities for gamma rays in the 200 keV-30 MeV range. Others are the Minute-of-Arc Resolution Gamma Imaging Experiment (MARGIE) and the Energetic X-ray Imaging Survey Telescope (EXIST).

The versatile RENA-2 ASIC with wide range of features can help in advancing the present knowledge of the fluxes of energetic charged particles in space and their production mechanisms and understanding the ways in which these particles are energized and transported throughout the universe. This is fundamentally important for understanding how the cosmos functions. The new ASIC will both enable and enhance new investigations of energetic charged particles by NASA's science missions. Instruments incorporating the RENA-2 chip will be much less resource-intensive than their present-day predecessors. Replacement of the usual many strings of charge amplifier circuitry with a single chip saves volume, weight, and power. New missions, such as the miniaturized spacecraft being planned, will be greatly enhanced in their ability to measure energetic particles by RENA-2. Instruments with superior measurement capabilities will also be enabled. The new chip will allow a new generation of space flight instruments to have a large impact on imaging and understanding of x-rays, gamma rays and energetic charged particle fluxes in space.

The new chip discussed in this report can also be used for many other applications such as nuclear physics; nuclear chemistry; nuclear medicine; medical and industrial radiography; x-ray and gamma ray imaging; nondestructive evaluation (NDE) and nondestructive inspection (NDI) applications; and baggage, container, vehicle, mail, etc. scanning for security and other reasons. Medical imaging applications include high resolution solid state gamma camera and Single Photon Emission Computed Tomography (SPECT) based on the solid state gamma camera concept. Other medical imaging applications include small compact gamma camera and SPECT for small organ imaging such as breast and thyroid and/or metabolic imaging of small animals. Industrial applications include mainly NDE and NDI. Security applications include high resolution baggage, container and vehicle imaging.

BACKGROUND OF THE INVENTION

Over the past few years, solid state detectors such as silicon strip detectors have revolutionized high energy and nuclear physics research. The progress and demand for silicon strip detectors also increased in other fields where their potential high resolution detection capability became apparent. Although an excellent detector, silicon, with an atomic number (Z) of 14, does not have good quantum efficiency for higher energy x-rays and gamma rays. Therefore, recently a significant amount of research has been carried out to develop high-Z strip and pixel detectors. Out of this work, six detector materials have become the potential front runners, Germanium (needs cryogenic cooling), CdZnTe, CdTe, $HgI_2$ and GaAs (both can be used at or near room temperature). A newcomer to the field, with very high Z, is $PbI_2$. These materials provide high detection efficiency for x-ray energies in the 10 to 1,000 keV range with detector thickness of about 0.5 to 15 mm. One positive effect of this small thickness is that depth effects, which degrade position resolution for radiation coming in at an angle, are minimized. Consequently, these high-Z detectors are now routinely manufactured with strip or pixel sizes in the mm to sub-mm-range. Such high spatial and energy resolution two-dimensional x-ray and gamma ray sensors are expected to become the standard in the future.

Although strongly promising high-Z position sensitive solid state detectors were developed, an essential component to make them viable instruments for detecting and imaging x-rays, gamma rays and particles has been missing. Such detectors have many channels with small pitch, and reading them out with conventional discrete or hybrid electronics is not a viable option. These detectors require monolithic multichannel readout electronics to handle both the high number of channels and small pitch. Such ASIC chips, e.g., the Amplex (CERN) and SVX (LBNL) chips, have been developed for accelerator-based high energy physics experiments. However, these chips lack two major functions, which are not needed for those experiments but render the chips mostly unsuitable for use in nuclear physics, astrophysics, and medical and industrial imaging:

1. They do not have a self trigger output. In high energy physics experiments, an external machine trigger is available to inform the data acquisition (DAQ) system about the exact time of an event for reading out the chips. In addition, the event trigger is typically based on the overall event topology rather than the signal levels in individual channels, which precludes its implementation on the readout chip.
2. The solid-state detectors for which these ASICs were developed provide position information only; the energy information is largely irrelevant as the particles of interest are all minimum ionizing anyway. Consequently, such chips do not need to have low noise and thus high energy resolution capability.

By contrast, in space-based (high-energy) astrophysics as well as most medical and industrial imaging, the x-ray and gamma-ray photons and charged particles come randomly. In many applications, it is also important to measure the x-ray, gamma ray and particle energies with as high accuracy as possible. Therefore, the application of position sensitive solid state detectors to nuclear and astrophysics and to medical and industrial imaging was largely delayed as a suitable ASIC readout chip was not available. There have only been few exceptions such as the ACE chip used with silicon strip detectors on board the Advanced Composition Explorer (ACE) space mission. It is thus important to develop versatile ASICs for reading out solid state sensors for application to the above mentioned fields.

Previously we have developed a chip, called RENA (Readout Electronics for Nuclear Application) for a new scintimammography system. The RENA chip has been patented (U.S. Pat. Nos. 5,696,458, 6,150,849 and 6,333,648). This chip has reached a level where it was useful for imaging as well as physics research applications using various kinds of solid-state detectors; for example, it has been used successfully with silicon strip and CdZnTe pad detectors. The RENA chip is a 32-channel, mixed signal, low-noise, general purpose monolithic application specific integrated circuit (ASIC). It was developed as the front-end electronics chip for medical imaging such as gamma camera and SPECT (Kravis et al., 1999). Its dynamic range is 50,000 electrons. The chip has a self-trigger output so that random signals without an external trigger can be processed. It offers several different externally selectable integration (peaking) times to accommodate different charge collection times for different detectors. It has several readout and data acquisition modes for versatile implementation and for detailed diagnostic testing. The output signals from the 32 channels are multiplexed to a single analog output buffer under the control of the chip's readout section. Significant effort was spent to make RENA low noise ($\approx 150$ e rms@0 pF input capacitance), but tests performed have indicated there are new ways to improve the noise. Also the RENA chip could only partially answer the requirements of many applications listed above. Therefore, a new ASIC, RENA-2, is developed, which can have different dynamic ranges and shaping (peaking) times, fast timing, low power consumption, lower noise, simplified user interface, and reduced channel-to-channel mismatch of the trigger levels, etc.

We describe here the new RENA-2 front-end readout ASIC designed to address these concerns and also bring significantly more functionality. The new chip is designed to be versatile and, therefore, easy to be modified and optimized for different applications, have much lower noise and thus much improved energy resolution, enabling users to take advantage of the exceptional potential for high energy resolution that solid-state detectors offer. Below the design and specifications of the new ASIC will be discussed in detail.

SUMMARY OF THE INVENTION

The design of the ASIC is guided by two principal goals. The first goal was to make the chip applicable to as wide a variety of applications as possible; this called for a flexible yet easy to use design. It has the ability to combine, on the same chip, signals that differ in terms of their polarity, rise time, threshold requirements, etc. This option, which is not available on the present RENA chip, enables users to optimize their system layout for the shortest possible signal connections, without regard to signal type. This contributed to achieving the second goal, which is equal in importance to the first, namely performance, for example, to obtain the best resolution possible for the combined detector-readout system. To reach this goal, we have designed the RENA-2 ASIC to achieve the lowest possible noise consistent with the characteristics of the detectors with which the ASIC is intended to be used.

The RENA-2 ASIC can be used with Low atomic number (Z) detectors such as silicon and carbon (diamond) as well as high atomic number (Z) semiconductor detectors such as Ge, GaAs, Selenium, CdTe, CdZnTe, $PbI_2$, $HgI_2$, in multi-channel strip or pixel or other geometries to detect and image x-rays, gamma-rays and particles in the range of 100 eV to 100 MeV. Other applications include reading out detectors or instruments such as Photo Diodes, Avalanche Photo Diodes (APDs), amorphous silicon detector arrays, PMTs, multi anode PMTs (MAPMTs) and VLPCs.

The features include low-noise performance, self-trigger capability, several different peaking times, different readout modes, and the daisy-chain option. New innovative features, such as user-selectable dynamic ranges and the ability to provide channel-by-channel timing information, were added. These new features, as well as the significant performance improvements required a completely new design for the new developed ASIC. The design goal for the noise performance, in particular, represents a significant improvement over the present RENA chip and substantial innovation was required in order to reach this goal. Innovation was even more urgently needed to achieve improved noise performance while reducing the chip's power consumption.

Some key specification requirements for the RENA-2 chip are shown in Table I. For comparison, we also list the corresponding characteristics of the RENA chip. These requirements and proposed solutions for implementing the features listed in Table I are discussed below. Based on these requirements and solutions, a top-level design for the chip is drawn and shown in FIG. 1.

Table I shows the main specifications for RENA-2 ASICs. These features include the chip's low-noise performance, its self-trigger capability, and the versatility it offers by providing several different peaking times, different readout modes, and the daisy-chain option. New, innovative features include low noise, self resetting charge sensitive input amplifier, selectable multi-range shaper, user-selectable dynamic ranges, fast trigger output for coincident event detection and the ability to provide channel-by-channel time difference information. The comparator thresholds will be individually adjustable through an 8 bit DAC on each channel. This will allow accurate and uniform threshold setting throughout the detector. Two very important new features for space deployment are the adjustable power consumption by limiting the current flow to the input transistor and the radiation hardness inherent to the 0.5 micron CMOS process. The peaking times were made adjustable from about 0.4 to 40 microseconds, which makes the chip suitable for a wide range of detectors, from CdZnTe to HgI$_2$ as listed above. The new chip incorporates a pole zero cancellation circuit to handle large rates without significant pileup. The functionality of the new RENA ASIC is dramatically improved by eliminating unnecessary connections and interface. Another important new feature is the inclusion of 4 extra channels to allow the connection of the cathode side into the same ASIC. The input amplifier is made tolerant to leakage current so that the ASIC can be used DC coupled which eliminates the need to use capacitive coupling.

The RENA chip offers the user some flexibility by providing a variety of readout modes—sparse, nearest neighbor, and global readout. The nearest neighbor mode is quite useful to account for charge sharing in strip detectors or other essentially one-dimensional detector arrays. However, its successful application requires a monotonic mapping of detector strips to RENA channels, which is not always optimal from the point of view of interconnect capacitance or mechanical constraints. In addition, extension of the nearest neighbor mode to two-dimensional arrays, though equally desirable, is not possible, simply because there is no "natural" mapping from the four to eight nearest neighbors of a given pixel to the sequence of channels on the readout chip. Instead, RENA-2 provides the user with high flexibility that is the ability to specify which channels are to be read on a case-by-case basis. In this scenario, the readout pattern is controlled by a serial shift register with one bit per channel; if a bit is set, the corresponding channel is read out. Initially, when a channel triggers, the corresponding bit in the readout register is set. Before reading out the detector data, the control logic can inspect the trigger pattern and, if necessary, replace it with a different readout pattern. This operation can be completed in 2.3 $\mu$s (for 36 channel ASIC), regardless of the total system channel count, with a suitably designed external controller FPGA; it need not significantly compromise the dead time specification. The readout pattern can be a nearest neighbor pattern customized to the particular experimental setup. This gives significant flexibility for application to a variety of detectors of different configurations such as pixel and strip detectors.

TABLE 1

Key requirements and suggested features for the design of the RENA-2 ASIC. For comparison, the corresponding characteristics of the existing RENA ASIC are also listed.

| Specification | RENA-2 ASIC | RENA ASIC |
|---|---|---|
| Signal range | Two full-scale ranges; 50 and 250 ke, selectable for each channel (Other ranges are possible.) | Fixed, typically 50 ke full scale |
| Input polarity | + or − (Selectable channel-by-channel) | + or − (Selectable for the whole ASIC) |
| Number of channels | 36 Channels (Extra channels added to allow connection of the cathode electrode) | 32 Channels |
| Noise | Minimize noise (18 aC (112 e) rms in the 9 fC signal range and 45 aC (280 e) rms in the 53 fC range) | Minimize noise |
| Noise optimization | 2 pF and 9 pF detector capacitance | 6 pF detector capacitance |
| DC leakage current | Minimize effects and to be tolerant | Not allowed above pico Amps region |
| Power consumption | Adjustable. (Minimize power through adjustments to the current supplied to parts of the circuit) | Not adjustable but designed to be reasonable |
| Fast timing output | Low jitter (Minimize jitter as far as possible) | Not available |
| Channel-to-channel time difference | Implemented | Not implemented |
| Input amplifier resistive feedback | Fixed resistance with or without resistance multiplier and/or MosFET based resistance | None |
| Trigger comparator thresholds | Individually adjustable by internal 8 Bit DACs for each channel | Externally adjustable for the whole chip |
| Peaking times | 0.4 to 40 microseconds in 16 steps | 0.4 to 6 microseconds in 8 steps |
| Fast count rates | Using pole zero cancellation | Not available |
| Detector structure | Heterogeneous (or homogeneous) | Homogeneous |
| Key gamma signals | 1 keV, 6 keV, 14 keV, 60 keV, 141 keV, 511 keV, 662 keV, 1.33 MeV and up to 10 MeV | 14 keV, 60 keV, 141 keV |
| System components | Pipeline A/D converter, FPGA state machine controller, data FIFO | A/D converter or PC-based A/D board, control software on PC or microcontroller |
| Interface | Minimum pin count and support component count | Simple protocol |
| Readout mode | Maximum flexibility through hit register | Simple protocol |
| Dead time per event | Minimize as far as reasonable (Reset is much faster.) | Not minimized |
| Radiation tolerance | Minimize radiation damage effect about 0.1 to 1 MRad | Not considered |

DESCRIPTION OF THE PREFERRED EMBODIMENTS

Figure 1:
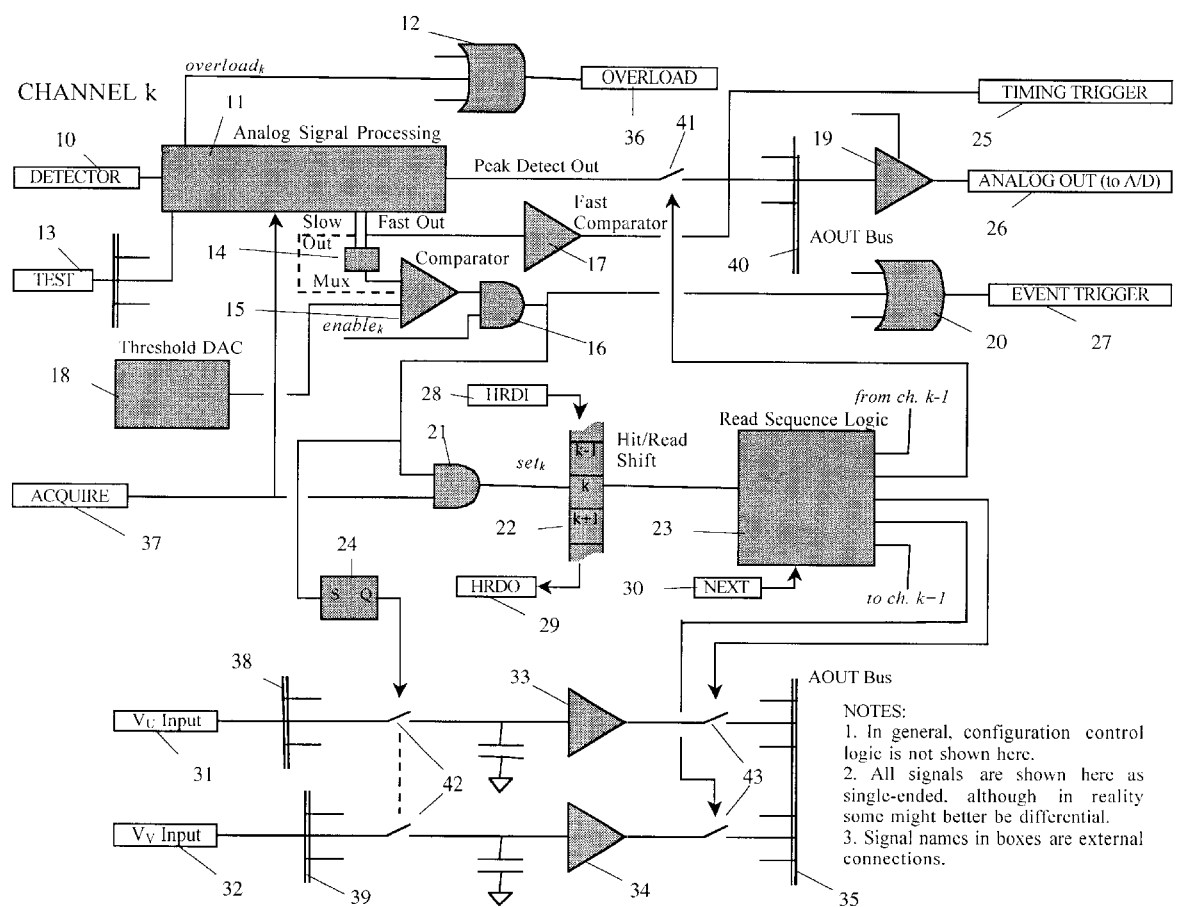
FIG. 1 is a preliminary block diagram of the developed new ASIC. Only one channel (channel k) is shown; connections to adjacent channels are indicated where applicable; the slow and fast signals are shown multiplexed here but in one embodiment separate comparators can be used for the slow and fast signals from the analog section.

Referring to the ASIC described in FIG. 1 a detector 10 is connected to the input of the ASIC and the input goes to an analog signal processing unit 11. The FIG. 1 shows only one of the analog channels of the ASIC, the k channel. Analog processing unit is described below. Peak detector output of the analog signal processing unit 11 goes to analog output buffer amplifier 19 through a switch 41 controlled by read sequence logic 23. The peak detect output is also attached onto a bus 40 before it enters analog output buffer 19. Analog output is made available to the outside world as an output 26 of the ASIC. A test input 13 is used to test the analog signal processing unit. An overload sensing element 12 is connected to the analog signal processing unit 11. Output of the overload sensor 36 is provided to outside world as an output of the ASIC.

Analog signal processing unit 11 outputs a slow and fast shaper signal during processing of the signal from the detector 10 which go into a multiplexer 14. Output of the multiplexer 14 goes into a comparator 15. In another embodiment shown in dotted lines the fast shaper output goes separately into a fast comparator 17, whose output goes out to the outside world as the timing trigger output 25. Similarly the slow shaper output from the analog processing unit 11 goes separately to the comparator 15. The threshold of comparator 15 is adjusted through threshold DAC 18. The threshold DAC 18 is set by the external control computer through the configuration control logic, not shown. The output of the comparator 15 is gated (or AND circuit) 16 by using an enablek signal. The output of the gate 16 goes to an OR circuit 20. The gated comparator 16 outputs from other analog channels also come to the OR circuit 20. The output of the OR circuit is send outside the ASIC as the event trigger 27. The output of the gate 16 also goes to the gate 21 and flip flop 24 which controls the switches 42.

An acquire 37 signal is sent by the data acquisition computer to the ASIC. This signal is routed inside the ASIC to analog signal processing unit 11 and to hit/read shift register 22 through a gate 21. The gate or AND circuit 21 is controlled by the output of the gated comparator 16. The output of the gate 21 is used to set the $k^{th}$ channel of hit/read shift register (signal is called set$_k$) when there is signal in that channel from the detector 10 which has produced a trigger signal comparator 15 and gate 16. The hit/read shift register is controlled by external signals HRDI 28 (hit/read data input) and HRDO 29 (hit/read data output). The output of the hit/read shift register 22 goes to read sequence logic 23. The read sequence logic circuit is controlled externally through an external signal NEXT 30 and also in general through configuration control logic not shown. Read sequence logic controls all the other channels similar to the $k^{th}$ channel shown in FIG. 1. Read sequence logic 23 also controls the switches 43 which control the output of the time difference measurement circuit as explained below.

There is a time difference measurement circuit which measures the difference of the arrival time of detector 10 signals at each channel. This circuit has two sign wave inputs $V_U$ Input 31 and $V_V$ Input 32. The phase of these two sign waves are at an angle, such as 90 degrees, to each other. These inputs are common to all channels and enter a bus 38 for $V_U$ Input 31 and bus 39 for $V_V$ Input 32. The distributes the sign waves to all the channels. At each channel flip flop 24 controls the switches 42 which allow the sign waves to charge separate capacitors at the input of amplifiers 33 and 34. The amplifier circuits 33 and 34 produce a voltage level at its output depending on the time the switches 42 are closed. If voltage levels from different channels which had data output by the amplifiers 33 and 34 for each channel are compared then a relative arrival time difference between the ASIC channels can be determined. The output of the amplifiers 33 and 34 go to a readout bust 35 through switches 43 controlled by the read sequence logic circuit 23.

In FIG. 1 the configuration control logic circuit 23 is not shown. This is a digital circuit which controls the ASIC analog data readout. All the signals shown in FIG. 1 are single ended. However, in the ASIC some of these are made differential when ever necessary.

Figure 2:
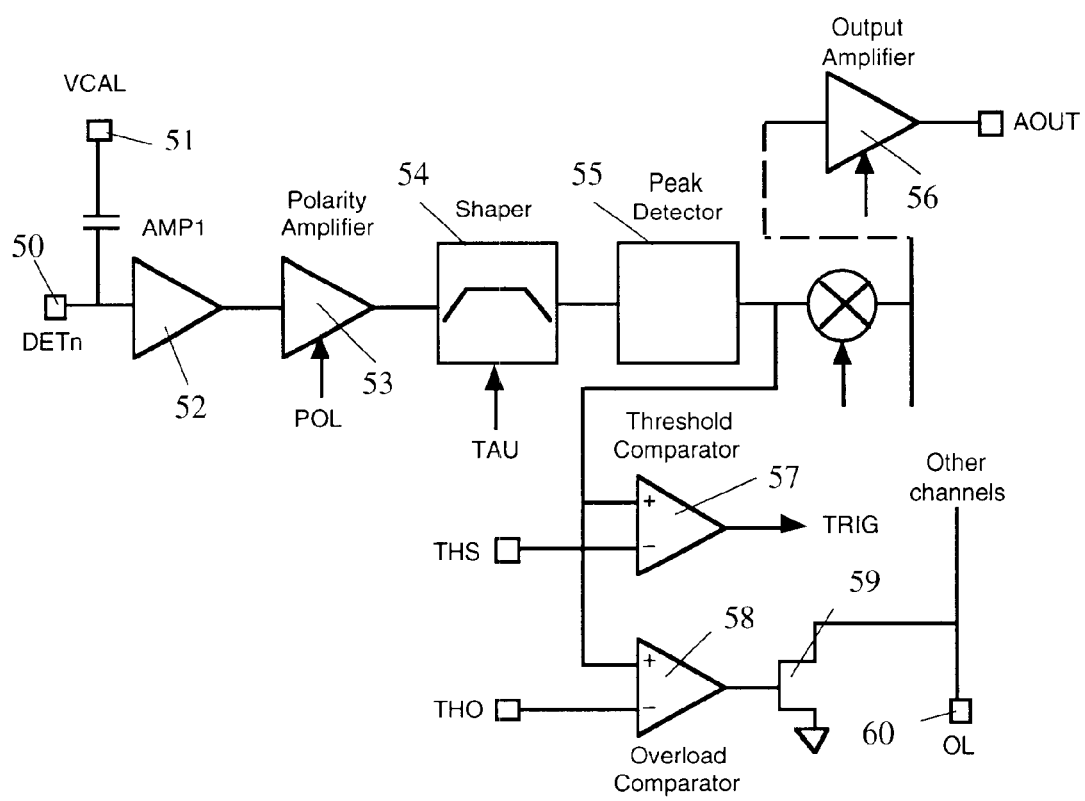
FIG. 2 is a block diagram of the analog section of the RENA chip

The analog circuit inside the analog signal processing unit 11 is similar to given in FIG. 2. It contains a detector input 50, test input 51, shaper 54, peak detector 55, overload comparator 58. The other comparators 15 and 17 are already discussed above. There may be a polarity amplifier 53 or other buffer amplifiers such as polarity amplifier 53. There is also a pole zero circuit after input amplifier 52 or anywhere else in the chain if better, not shown. The pole zero circuit can be switched on or off as necessary. Pole zero circuit reduces the pile up effect and thus increases the ASIC throughput rate.

Figure 3:
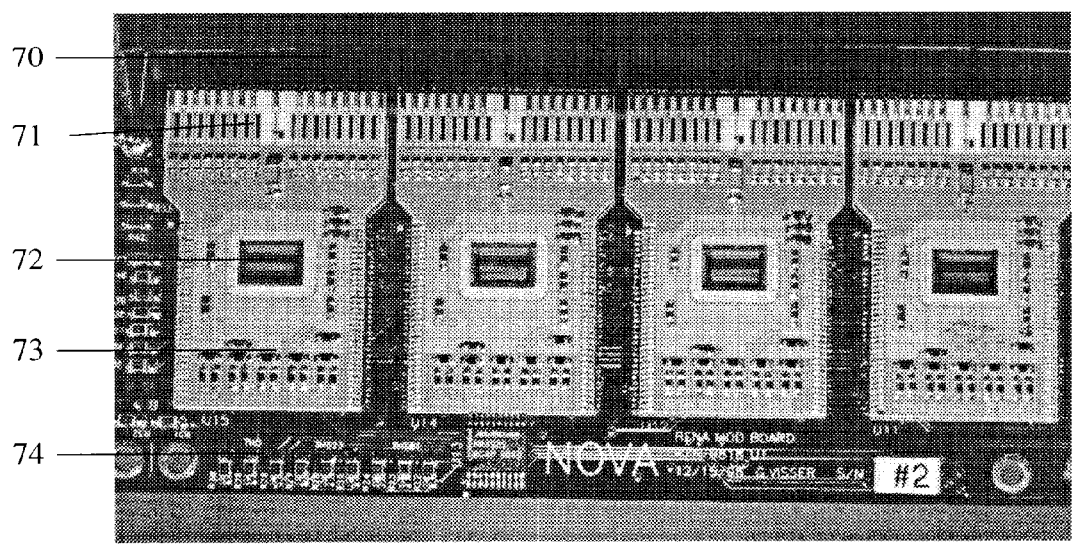
FIG. 3 is four RENA hybrids mounted onto a printed circuit board. The resistors and capacitors are mounted onto or fabricated on the ceramic carrier to produce high quality AC coupling to the detector channels.

The RENA chips are shown in FIG. 3. The detectors 70 are mounted on the end of the chip carrier 73 through coupling capacitors 71. The RENA chip 72 is mounted on the chip carrier 73. The chip carrier is mounted on top of the printed circuit board 74. The whole system shown in FIG. 3 forms a imaging detector unit with a total of 128 pixels, 4×32 array.

Figure 4:
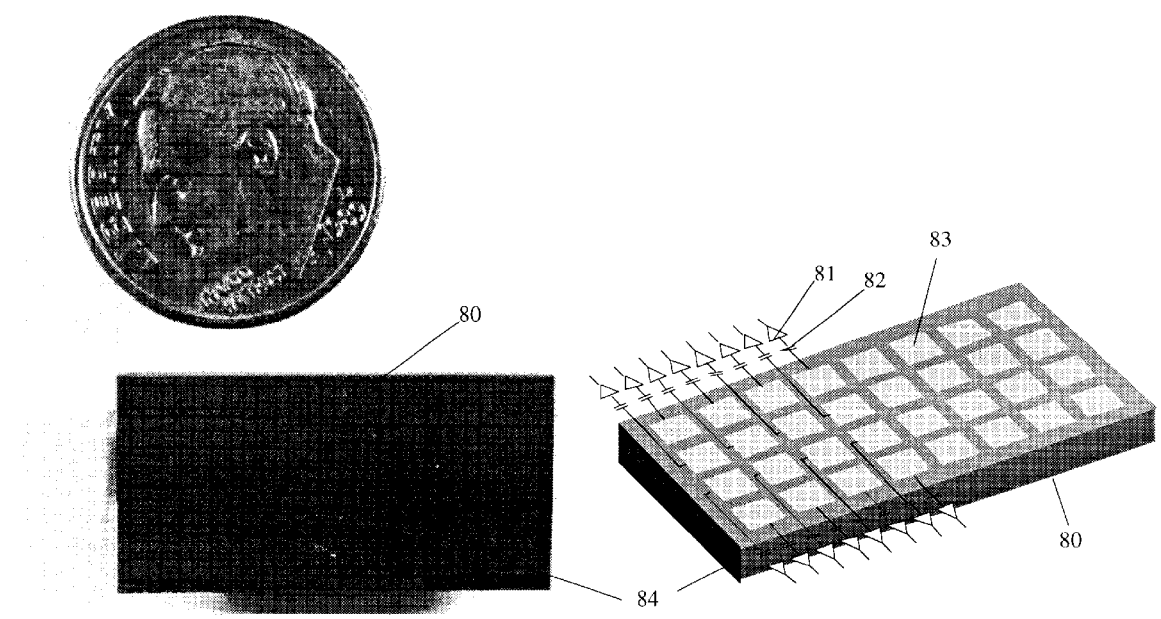
FIG. 4 is a CdZnTe 8×4 2-D pad detector array used to obtain the x-ray spectra as described in the text. Pad pitch is 3×3 mm.

FIG. 4 shows the CdZnTe 84 detector 80 used. The 4×8 array of pixels 83 are shown. The pixels are connected to the input of the ASIC input amplifier 81 through capacitative coupling 82. In RENA-2 due to self resetting type of input amplifier there will be no need for capacitative coupling 82 for most detectors and DC coupling will be used.

The signal range needs to be adjusted to meet the requirements of the various sensors that we intend to use with the RENA-2 chip. Different experiments may need widely varying energy ranges. We have implemented an adjustable signal range on the RENA-2 chip. One way to do this is to make the circuit components that control the signal range to be switchable. The two ranges built in are 9 fC and 53 fC, corresponding to photon energies of 250 keV and 1.5 MeV in CdZnTe (CZT), respectively (based on the typical energy of 4.4 eV required to create one electron-hole pair in CZT). The switching between the two ranges will be controlled, on a channel-by-channel basis, by an on-chip control register.

The RENA-2 readout chip is designed to have significantly lower noise and thus much improved energy resolution compared to the present RENA. This is an important and essential improvement that will significantly enhance the chip's usefulness for all kinds of applications. We designed for input-referred noise values of approximately 18 aC (112 e) rms in the 9 fC signal range and 45 aC (280 e) rms in the 53 fC range, for dynamic ranges of 500 and 1200, respectively. In order to accomplish the latter goal over the wide range of detector capacitances, we incorporated into the design two selectable different widths for the input transistor, for the noise optimization, using a control bit (again on a channel-by-channel basis). The new chip is optimized for the noise level for detector capacitances of 2 pF and 9 pF, respectively. With the lower detector capacitance, we expect to achieve a somewhat improved noise performance in the 53 fC range compared to the value given above, possibly 35 aC (220 e) rms.

We have performed the following steps in the effort to optimize the energy resolution of the new ASIC.
1. Low-noise CMOS process that have low 1/f noise is used.
2. The noise that may be injected by the peak/hold and digital electronics sections are minimized.
3. The design of the input amplifier and the shaper amplifiers are improved.
4. Reducing the gain of the input amplifier also can improve its tolerance of DC input current.
5. A self resetting type input amplifier is designed to increase tolerance to detector leakage current. This eliminates the need for AC coupling and consequently higher capacitance (and therefore higher noise), as well as errors due to recovery of the AC coupling network from prior events.
6. The silicon layout is improved so that it would make the analog section less susceptible to cross talk from the rest of the circuit and also to external noise pickup.
7. To further remedy the effect of baseline differences, we have used a DAC on each channel to set the threshold. The full-scale range of the threshold DACs is given by a reference voltage common to all channels (VTR in FIG. 1). This adds flexibility by allowing the DAC range and resolution to be adjusted to the requirements of specific experiments.

The dynamic range is adjustable or selectable to meet the requirements of the various sensors that we intend to use with the new readout chip. Different experiments may need different energy ranges. The dynamic range is made adjustable for the new chip. One way to do this is to make the circuit components that control the dynamic range to be switchable. Other options, such as controlling the dynamic range through an externally supplied voltage or current, is also possible.

One factor that currently limits the RENA chip's dynamic range more than the noise itself is the lack of any possibility to adjust baseline levels between the channels or alternatively adjust the trigger thresholds to compensate for any baseline difference. This means that the effective trigger threshold, in terms of photon energy, will differ from channel to channel and will be limited by the channel with the highest baseline level. A significant contribution to the baseline differences could come from variations in charge injection in the process of resetting the signal channels after an event. The levels clamped to during the reset process have been found to vary significantly less from channel to channel than those observed after the release of the reset switches. By improving the reset circuitry, the variability of baseline levels will be reduced.

To further remedy the effect of baseline differences, we used a DAC on each channel to set the trigger comparator threshold. The full-scale range of the threshold DACs is given by a reference voltage common to all channels. This adds flexibility by allowing the DAC range and resolution to be adjusted to the requirements of different experiments. Similarly DACs will be used to set the thresholds for the fast trigger comparators, which will give the fast or time accurate low jitter trigger and/or timing signal output.

An important application field for the developed ASIC chip will be space-based astrophysics experiments, where power consumption is an important issue. The major part of the power is consumed in the input transistor. Therefore, the current flow into the input transistor is made externally adjustable, thus allowing the capability of reducing the power of the ASIC. A large current flowing in the input transistor is essential for the low noise response of the new chip. However, our design and layout changes aimed at further noise reduction (discussed above) do not involve increasing that current flow. Thus, developing the highest possible energy resolution for the new ASIC chip will allow us more room for compromise in cases where ultra-low noise is less important than low power consumption.

Throughout the rest of the analog and digital circuits, where lowering the power consumption will not affect the noise performance of the chip, we will develop circuits with lowest possible power consumption for the selected fabrication process. This will allow the development of the new ASIC specifically for space-based astrophysics and other power-critical applications.

Many sections of the chip such as each channel, channel to channel time difference circuit, fast trigger circuit are designed so that user can externally power down the unused sections of the circuit, that is their power can be cut to reduce the power dissipated by the chip. All these are essential for power critical applications such as space based detectors, where all unused features can be turned off to reduce the power consumption of the new ASIC.

Information about the signal timing is important in many experiments, especially when coincidence measurements (between separate interactions in different parts of the instrument or between signals from different electrodes of the same detector) are required. Therefore, we plan to record information related to signal timing and make it available for readout together with the pulse height data. Since we anticipate a wide variety of range and resolution requirements for the time information, it will not be practical to incorporate full-fledged time-to-digital (or time-to-amplitude) converters on the ASIC. We made each channel to produce a low jitter fast trigger signal output 25 using a fast comparator (discriminator), which is multiplexed to produce a single timing output or they may even be made available separately for each channel although this would require large number of signal pads. To take full advantage of this new feature, the trigger output jitter is improved to achieve high resolution signal timing. We did this by adding to the signal path a second, fast shaper with low jitter optimized for timing rather than energy resolution and using this shaper to generate the trigger signal. Alternatively, to avoid the increased die space and power consumption that this solution would require, the timing resolution can be improved by tapping the trigger signal off of the first shaper stage(s).

We have also incorporated into the design a channel to channel event arrival time difference measurement circuit. Two inputs are provided for two user-provided analog signals ($V_U$ and $V_V$) whose momentary values will be stored for readout in channel-specific sample-and-hold circuits whenever the respective channel's trigger comparator fires. The known time dependence of these external signals, which can be optimized for the specific application, can then be used to reconstruct the actual timing information. Examples of suitable external signals include sinusoidal waveforms, with a 90° phase difference to resolve ambiguities, or linear ramps that are initiated by the first channel trigger for any given event.

In the RENA-2 chip we have designed every channel separately and externally switchable to either input polarity; negative (electrons) or positive (holes). Placement of the polarity switch is changed from just after the charge sensitive amplifier 52 at the input to before, inside or after the peak hold (detect) 55 circuit.

In the RENA-2 chip we have designed several different types of feed back circuit for the charge sensitive input amplifier 52. The different feedback circuits incorporated into every channel can be selected by the user for application to different instruments and devices. These feedback circuits are:
1. Resistance placed internal or external to the ASIC.
2. Resistance multiplier placed internal to the ASIC.
3. Any type of resistance with an integrating capacitor placed internal or external to the ASIC.
4. A MOSFET transistor resistance circuit.
5. Integrating capacitor.
6. Any or all of the above feedback combinations with a reset switch.

The RENA chip offers the user some flexibility by providing a variety of readout modes—sparse, nearest neighbor, and global readout. The nearest neighbor mode is quite useful to account for charge sharing in strip detectors or other essentially one-dimensional detector arrays. However, its successful application requires a monotonic mapping of detector strips to RENA channels, which is not always optimal from the point of view of interconnect capacitance or mechanical constraints. In addition, extension of the nearest neighbor mode to two-dimensional arrays, though equally desirable, is not very practical, simply because there is no "natural" mapping from the four (or six, for a hexagonal detector array) nearest neighbors of a given pixel to the sequence of channels on the readout chip. Other schemes, such as reading out the (single) cathode of a detector whenever one of the anode pixels triggers (or vice-versa), are equally difficult to anticipate.

Instead, in the RENA-2 chip we have provided the user with the ability to specify which channels are to be read on a case-by-case basis. In this innovative new technique, the readout pattern is controlled by a serial shift register 22 with one bit per channel; if a bit is set, the corresponding channel is read out. Initially, when a channel triggers, the corresponding bit in the readout register is set. Before reading out the detector data, the user can then inspect the trigger pattern and, if necessary, replace it with a different readout pattern. This operation can be completed in 2.1 $\mu$s (for 32 channel ASICs), regardless of the total system channel count, with a suitably designed external controller FPGA; it need not significantly compromise the dead time specification. The readout pattern can be a nearest neighbor pattern customized to the particular experiment setup, a global readout (by setting every bit in the readout register), or any other pattern that may be needed for the specific situation. While it would seem at first glance that offering this mask read/write capability would increase the complexity of the ASIC's user interface, the opposite is actually true: The logic and interconnect resources required to implement the nearest neighbor mode alone, especially across multiple chips, is more complex than the readout shift register technique.

The RENA-2 chip can be also set up to automatically disable additional triggers about 50 ns or more delay after the initial trigger. This time delay is useful to allow multiple simultaneous or nearly simultaneous input signals of varying pulse height to reach the full pulse height for correct energy measurement.

In addition to the 32+4=36 signal channels, the RENA-2 chip has two analog-only isolation channels, one each on either end of the analog channel group. One or both of these isolation channels, can be used to measure correlated noise during an event and they also have test points where a probe can be used to have access to signals inside the analog channel at critical points.

In summary, we have developed a RENA-2 ASIC readout chip designed to accommodate a wide range of position sensitive or multi array solid-state x-ray and gamma ray detectors to be used in space-based astrophysics and/or in many other commercially important applications. Our main goal is to produce a readout system that will enable its user to take full advantage of the good energy resolution offered by these detectors. The result is a new ASIC chip optimally suited for space-borne astrophysics experiments, and medical and industrial imaging instruments that plan to image x-rays, gamma rays and charged particles with high energy and spatial resolution.

Test Results

The RENA chip is a charge-sensitive 32-channel mixed signal ASIC; its specifications are shown in TABLE 2. The present version has a dynamic range of 50,000 electrons and maximum output swing of 2 V. The input is single-ended with the input amplifier referenced to an external low-noise reference voltage. The output signals from the 32 channels are multiplexed to a single analog output buffer under the control of the chip's readout section.

A block diagram of the analog signal path for one of the 32 channels is shown in FIG. 2. The first stage of the signal path, AMP1, is a switched-reset integrator 52. The input amplifier 52 is designed to have a large open loop gain, to reduce noise and improve the response to high input capacitance sensors. A calibration input 51 to AMP1 allows simple testing of analog channels using an external signal source. The second stage of the signal path is a polarity amplifier 53, which amplifies the signal from the first stage and has a control to select a positive or negative gain. This feature allows RENA to be used with both electron- and hole-collecting detectors. The shaper 54, which follows the polarity amplifier 53, is a first order transconductance-C bandpass filter with programmable bandwidths. These bandwidths are selected through three bits in the chip's configuration shift register. The filtered signal is peak-detected 55 in the following stage. During readout, the peak-detectors 55 are isolated from the shaper by a switch, to avoid spurious signals from late hits.

Two comparators 57 and 58 sense the output level of the peak detector 55. The threshold comparator 57 generates the trigger signal that is then used in the channel logic. The overload comparator 58 may be used, for example, to sense a high-energy event or detect events inside an energy window. The channel outputs from either comparator are OR'ed to pads TRIG and OL 60, respectively; in addition, the individual outputs from the threshold comparator are used by the readout logic to determine which channels need to be read. The thresholds for the two comparators are controlled by the external voltage levels supplied through pads THS and THO. The peak-detected signals from all channels being read are multiplexed to an output amplifier connected to output pad AOUT. This output amplifier is tri-stated when the RENA chip is not being accessed. This allows the output amplifiers of several (daisy-chained) chips to share a common analog output bus. For test purposes, any channel can be continuously connected to AOUT ("Force Enable Mode").

In addition to the 32 signal channels, RENA has two analog-only isolation channels, one each on either end of the analog channel group. Channel 33, the isolation channel at the 'high' end of the chip, can be used to measure correlated noise during an event.

disabled during readout in order to avoid spurious coincidences. This is accomplished by an external signal that must be supplied to the TDIS input, after a suitable delay to account for pulse-height dependent time walk and different charge collection times from truly coincident signals. Alternatively, the chip can be set up to automatically disable additional triggers about 50 ns after the initial trigger.

Up to sixteen RENA chips can be daisy-chained together and read out as if they form a single chip with up to 512 channels. This is advantageous for detectors, which have more than 32 channels. For example, a strip detector with 128 strips on each side can be read out by four RENA chips on each side daisy-chained together.

This section describes tests of the RENA chips that have been performed at NOVA. Those tests that required actual x-ray detector signals were carried out using two-dimensional CdZnTe pad detector arrays. Details of the setup and the test results are discussed below.

FIG. 3 shows four RENA chip ceramic hybrids soldered onto a printed circuit board. Detectors (FIG. 4) can be connected to the hybrids via standard connectors. The hybrids were designed to abut with each other so that a long chain of detectors can be made.

The energy resolution for CdZnTe pad detectors is excellent because of the large number of electron-hole (e-h) pairs created. Approximately one e-h pair is produced per 4.4 eV energy $$R_l = \Delta E/E = 2.35/\sqrt{N}$$

deposited. Assuming a Poissonian distribution, the limiting resolution $R_l$ (FWHM), due only to statistical fluctuations in the number of charge carriers, can be calculated according to where N is the number of e-h pairs created (Knoll, 1989).

For example, an x-ray photon with an energy of $E_0=100$

TABLE 2

RENA chip specifications.

| | |
|---|---|
| Number of channels | 32 + two test channels |
| Readout modes | Sparse readout: Readout is limited to channels whose signal level is above the trigger threshold |
| | Neighbor readout: Sparse readout, with additional readout of channels adjacent to triggered ones |
| | Global readout: Read all enabled channels in response to any trigger |
| | Select all: Read all enabled channels on an external trigger pulse |
| Trigger threshold | Voltage input, 1.5 V to 3.5 V |
| Trigger disable | Automatically after a trigger, or in response to an external signal |
| Readout data | Channel and chip addresses, pulse height and high threshold set bit |
| Readout time | ≈800 ns per channel |
| Daisy chain | Up to 16 chips can be daisy chained to be read out as a single chip |
| Power | 200 mW per chip |
| Test output modes | Enable any one channel for continuous output |
| Peaking time | 0.4, 0.73, 1.06, 1.34, 1.73, 3.17, 4.61 or 6.05 μs |
| Dynamic range | ≈1 ke to 50 ke input for 1.5 to 3.5 V output |
| Input referred noise | ≈150 e rms @ 0 pF with 8 e rms/pF slope |
| Die size | 4.9 × 6.9 mm² |

The RENA chip has several different readout modes, as shown in Table 2. In the "sparse" mode, only channels that are triggered (have a signal above the threshold of the low-level comparator) are read out. In the "neighbor" mode, the nearest (adjacent) channels immediately above and below any channel that has valid data are also read out. This mode is important if charge sharing between detector channels is expected to happen with significant probability. In the "global" mode, all channels are read out in response to a trigger. The "select all" mode allows an external trigger to initiate readout of all channels. In all modes, triggering and readout can be disabled for any channel. Once a channel is triggered, any additional triggers on the chip should be keV which is absorbed via the photoelectric effect generates about 22,700 e-h pairs in CdZnTe, from which we obtain $R_l=1.5\%$.

The limiting energy resolution for 60 keV x-rays can be calculated similarly to be 2% (or 1.2 keV). This shows that there is room to improve the energy resolution. Charge trapping is the major cause of lower energy resolution, and improving the purity of the materials used has led to significant improved during the last several years. More improvements are expected in the near future.

The energy resolutions discussed above are dramatic improvements over scintillators; with NaI(Tl), for example, one obtains 30% at 60 keV. CdZnTe pad detectors also have small capacitances, at most a few pF per pad, which leads to low noise charge sensitive amplification to preserve the excellent energy resolution. The high energy resolution is important for astrophysics missions and nuclear physics experiments as well as many commercial applications.

A CdZnTe pad detector has been produced from $Cd_{0.9}Zn_{0.1}Te$ wafers. Each detector has 32 pads with a pad area of 3×3 $mm^2$. The 32 pads are arranged in a 4×8 array for a total active area of 12.5 mm×25 mm. The detector is slightly less than 2 mm thick and made from two separate 4×4 sections to increase yield. The bias voltage is supplied in between the two sections to the top of the detectors.

Figure 5:
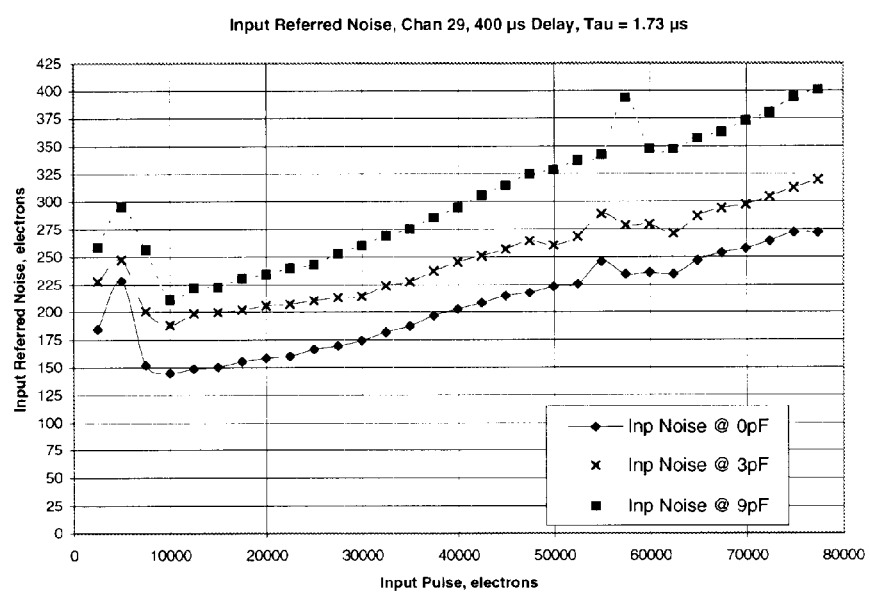
FIG. 5 is a graph of input referred noise vs. input pulse height. Three curves are shown for 0, 3, and 9 pF capacitances. The measurement was performed with the capacitor directly connected to the RENA chip input.

The tests of the RENA chip that have been performed included its functionality and noise characteristics. The noise measurement with respect to input capacitance is shown in FIG. 5. It shows 150 e rms noise at 0 pF input with a slope of 8 e rms/pF.

Figure 6:
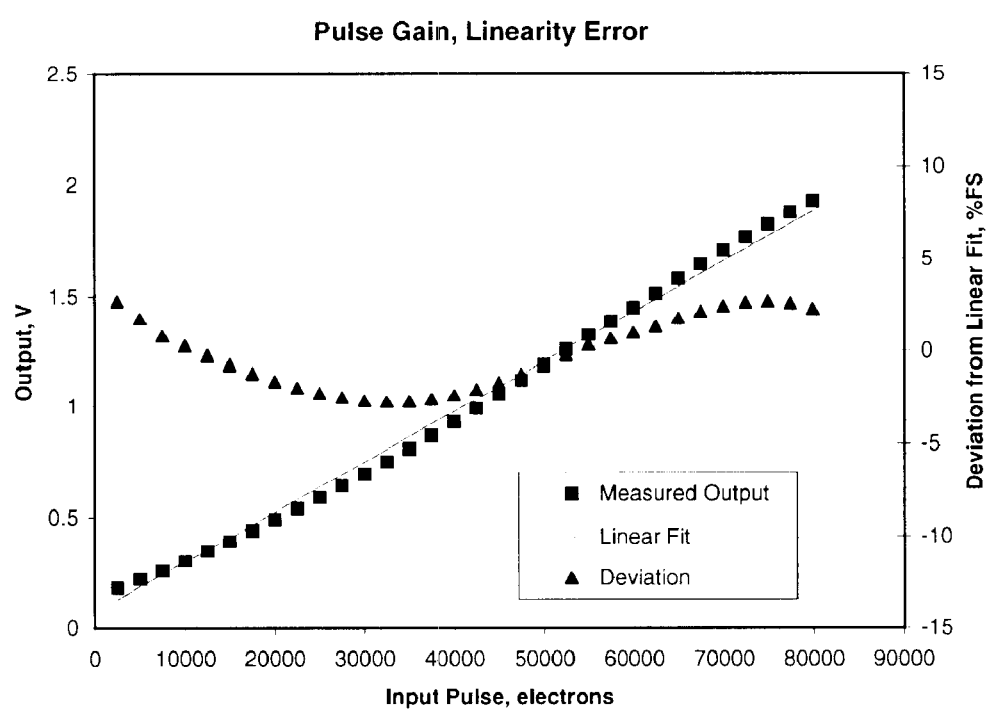
FIG. 6 is a graph of RENA chip linearity measurement. Output voltage vs. input test pulse height. The deviation from a linear fit is indicated by the triangles, with the scale shown on the right hand side.

Measurements of the gain linearity over the entire operating range of the RENA chip have been performed by supplying pulses to the test input of the chip and measuring the voltage output. The results are shown in FIG. 6 and indicate that the linearity of the gain is about a factor of two better than the design specifications and simulations.

Figure 7:
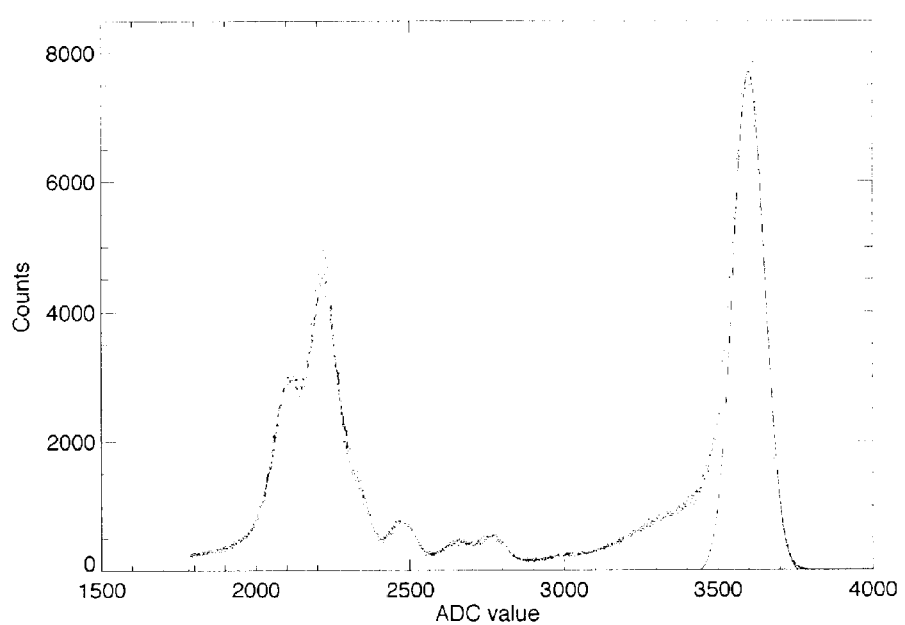
FIG. 7 is a spectrum of $^{241}$Am obtained with a CdZnTe pad detector (FIG. 4) connected to a RENA chip.

The CdZnTe detector described above was used in conjunction with the RENA chip to obtain x-ray spectra of $^{241}Am$, one of which is shown in FIG. 7. To obtain this spectrum, the signal from the RENA chip was digitized using a 14-bit ADC. The detector was operating at a temperature of 12° C. The curve shown in FIG. 7 represents a Gaussian fit to the high-energy side (which should not be affected by charge trapping) of the 59.5 keV peak to determine the energy resolution. The FWHM resolution obtained from this fit is 2.83 keV ($\sigma$=1.20 keV).

Figure 8:
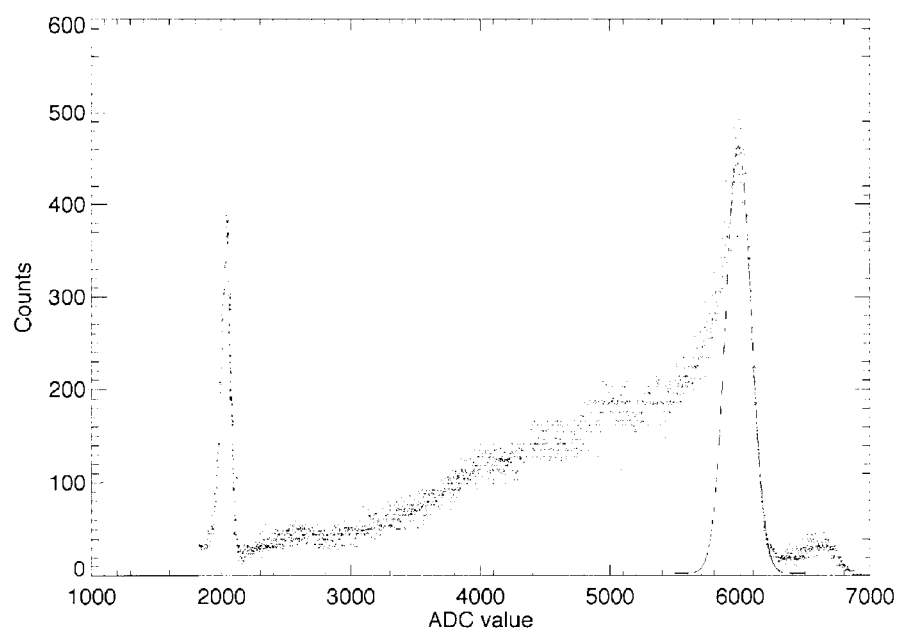
FIG. 8 is a spectrum of $^{57}$Co obtained with a CdZnTe pad detector (FIG. 4) connected to a RENA chip.

The $^{57}Co$ spectrum shown in FIG. 8 was obtained under the same conditions. The three $\gamma$-lines at 14.41, 122.06, and 136.47 keV are clearly discernible. From the fit to the 122 keV peak which is shown in FIG. 8 we obtain a FWHM resolution of 5.5 keV ($\sigma$=2.32 keV).

To explore the noise limitations of the chip, further tests were performed with a silicon photodiode (Hamamatsu S5972) connected to one of the RENA channels. As in the CZT measurements, the detector was cooled to 12° C. The setup was used to measure the spectrum of $^{241}Am$ shown in FIG. 9. The nuclear $\gamma$-lines at 26.3 and 59.5 keV are clearly discernible, even though the detection efficiency of silicon is already significantly reduced at the higher energy. The FWHM energy resolution of the 59.5 keV peak is 2.32 keV ($\sigma$=0.99 keV). At lower-energies, we see x-ray lines resulting from transitions in the electron shell of Np, the decay product of $^{241}Am$; the two lowest peaks each result from two transitions that are too close in energy to be resolved.

Figure 9:
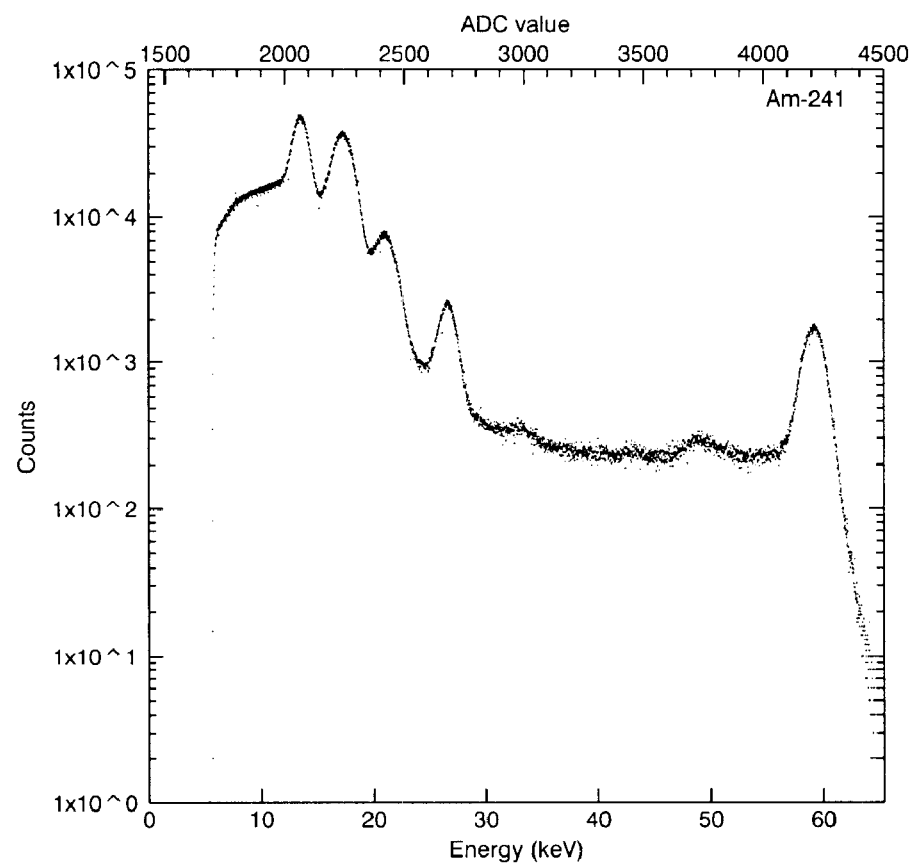
FIG. 9 is a spectrum of $^{241}$Am obtained with a Hamamatsu S5972 Si photodiode mounted onto a prototype RENA chip. The energy scale on the lower x-axis was obtained from the calibration shown in FIG. 10.
Figure 10:
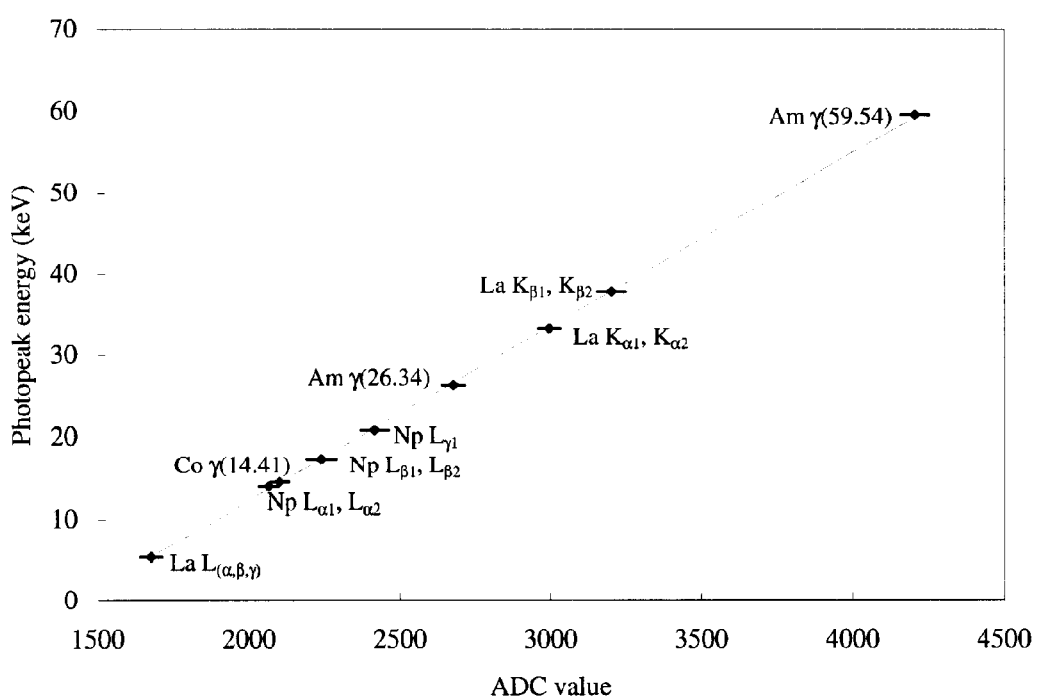
FIG. 10 is an energy calibration of a Hamamatsu S5972 Si photodiode obtained using various x-ray and gamma ray lines of $^{57}$Co, $^{139}$Ce, and $^{241}$Am.
Figure 11:
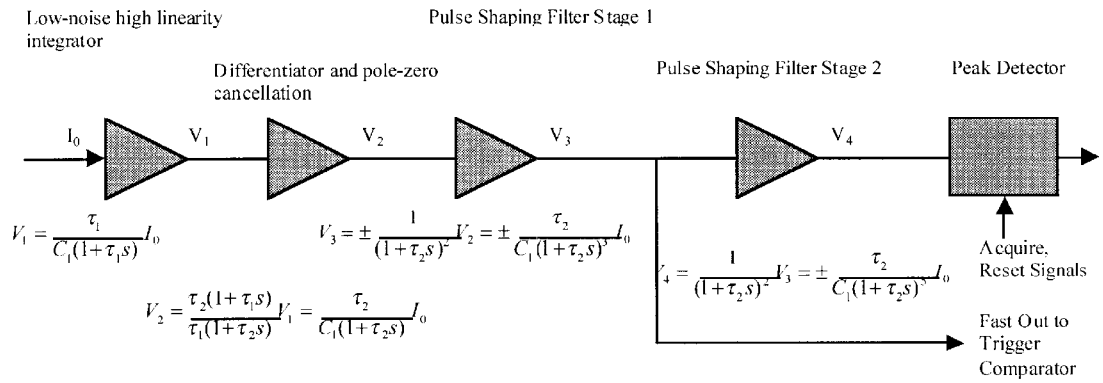
FIG. 11 is a block diagram of the typical signal characteristics and analog signal processing of the RENA-2 chip.

The energy scale shown on the lower x-axis of FIG. 9 was obtained from a calibration that used data from various x-ray lines of $^{57}Co$, $^{139}Ce$, and $^{241}Am$ and their decay products. The calibration is shown in FIG. 10. The lines are identified by labels accompanying each point. The horizontal error bars indicate the widths ($\sigma$) of the Gaussian fits used in the calibration. The maximum deviation of the individual data points from the straight-line fit shown in FIG. 10 is 2.1%; this is consistent with the pulsar data shown in FIG. 4. These are all raw spectra without any pulse shape discrimination or correction.

TABLE 3 shows the RENA-2 features and capabilities.

TABLE 3

RENA-2 chip features and capabilities.

1. Dummy or isolation channel structures (with low or no power) at each end of the array, to maintain uniformity.
2. Selectable signal polarity. (For the RENA-2 chip, this is done on a channel-by-channel basis, instead of globally as in RENA.)
3. Capability to monitor in continuous mode the shaper output of any given channel (for diagnostic use).
4. Capability to monitor in continuous mode the peak detector output of any given channel (for diagnostic use).
5. Sparse readout mode.
6. Neighbor readout mode using the new shift register technique which can also be applied to pixel detectors.
7. Global readout mode (for diagnostic use).
8. Selection of shaping time constants. (For the RENA-2 chip, this is done on a channel-by-channel basis, instead of globally as in the present RENA.). 16 selections cover the charge collection times of most interest. 2 bits for capacitor selections, 2 bits for gm selection.
9. Low-EMI signaling on all digital interfaces which must switch during signal acquisition, e.g., trigger, readout-initiate, reset (if needed). It is critical that these signals do not inject an interfering signal into the inputs.
10. Ability to wire several (at least up to 8) chips with simple scheme to a single controller (realized in an FPGA with 30 or preferably fewer I/O signals) and A/D converter, with no additional buffers or glue logic required (except level translators for the critical signals which do not use CMOS levels). This has been called "daisy-chaining" in the RENA data sheet.
11. Test signal input bussed to all channels, individual enable switch at each channel to connect test signal bus to input of channel via a small capacitor.
12. External delay from trigger to end of hit capture to allow all simultaneously hit channels to cross the trigger threshold and thereby be marked as hit. Another (external) delay from end of hit capture to end of peak detector acquisition to ensure that all channels marked as hit have actually acquired a full peak value in their peak detectors.
13. Selection (on a channel-by-channel basis) of one of two full scale signal ranges. See specifications for values. Two ranges would facilitate achieving lower noise for the smaller signals.
14. Lower power operation, insofar as possible. Power dissipation yet to be estimated. Power down bit per channel.
15. Selectable (on a channel-by-channel basis) noise optimization by changing the input transistor width using a control bit. Optimized for two capacitance input values.

TABLE 3-continued

RENA-2 chip features and capabilities.

16. Generalization of the "neighbor" readout mode using high-speed hit/read register to send hit pattern to and receive read pattern from external controller (FPGA). Sparse mode to work by default if no manipulation of the hit/read register is made during readout.
17. Internal threshold DAC on each channel, instead of external voltage input bussed to all channels in present RENA chip. A single external reference voltage input sets the minimum or maximum threshold level, and an individual DAC at each channel sets the trigger threshold above the baseline by an amount equal to (DAC code/max)*(reference input).
18. The hit/read register contents produces the channel address readout information.
19. The RENA overload comparator, this feature is included in the new ASIC.
20. Add front-end saturation detection comparator (to sense large overload signals, which may effect the normal functioning of the signal channel, and which may produce the effect similar to the present RENA style overload detection). A window comparator is being included. This circuit will respond when the input amplifier is saturated either high or low.
21. Shaper filter to have a fast and a slow signal path. The fast signal is fed to the trigger/timing comparator, the slow signal to the peak detector for pulse amplitude measurement. Both fast 17 and slow 15 shapers are included. A multiplexer 14 is included to select the shapers for the trigger comparator. (See block diagram, Figure 1.) Or separate fast comparator17 is used to produce the low jitter timing trigger or signal.
22. Differential analog output (with disable) to allow direct connection between one or more new ASIC's and AD92xx or similar type A/D converters with only passive filter network.
23. Higher speed (relative to present RENA) digital logic interfaces and also for the analog output. One or more analog outputs may be used.
24. Dead time performance is improved to allow for operation at moderate rates, up to 50 kHz/ch on all channels with single-hit events. Continuous mode will help this greatly.
25. Capture and readout of an individual analog timestamp for each channel, to allow for relative timing of hits on different channels to be measured. Must be implemented in such a way that it can be left unused with no significant impact on dead time, pin count, or other important performance parameters. Maximum spread in hit times between initial and final hits of a good event is <1 μs. Timing precision (after suitable time walk correction offline) is 2–30 ns FWHM.
26. Radiation tolerance >20 kRad(Si) and no destructive SEL. SEU is not a concern. Radiation tolerance is improved using standard CMOS technology with good design practice, no special rad-hard technology is used. Attention to radiation performance is given while making the layout. Special rad-hard process may be used in future versions.

Summary of RENA-2 Features and Functionality 1. 32 or 64 Channels+ at least 1 channel for detector bias side measurement+ 2 dummy or isolation channel structures (low or no power) at ends to maintain uniformity. Test pads on the extra channel(s) or dummy channel(s) if powered.
2. Selectable signal polarity on a channel-by-channel basis.
3. Capability to monitor in continuous mode the shaper output of any given channel (for diagnostic testing and evaluation).
4. Capability to monitor in continuous mode the peak detector output of any given channel (for diagnostic testing and evaluation).
5. Sparse readout mode.
6. Generalization of the "neighbor" readout mode where neighbor pixels can be selected in hardware by an FPGA for pixel detectors. Sparse mode will work by default if pixel detector mode is not selected.
7. Global readout mode (for diagnostic testing and evaluation).
8. Selection of shaping time constants. This will be done on a channel-by-channel basis.
9. Low-EMI signaling on all digital interfaces, which must switch during signal acquisition.
10. Ability to wire several (at least up to 8) chips with simple scheme to a single controller. This will enable to use 2 to 8 ASICs as if they were a single ASIC with 64/128 to 256/512 channels, for 32 and 64 channel versions respectively. This could be very useful for low rate detectors where a large saving in peripheral electronics can be achieved.
11. Test signal input bussed to all channels, individual enable switch at each channel to connect test signal bus to input of a channel via a small capacitor. This will enable easy testing of the ASIC without a detector connected.
12. (External) delay from trigger to end of hit capture to allow all simultaneously hit channels to cross the trigger threshold and thereby be marked as hit. Another (external) delay from end of hit capture to end of peak detector acquisition to ensure that all channels marked as hit have actually acquired a full peak value in their peak detectors. This feature is important for astrophysics application as multiple hit from varying energy quanta can be received nearly simultaneously, especially at high rate imaging.
13. Selectable full scale signal range 9 fC, 36 fC or 80 fC.
14. Lower power operation, insofar as possible. The power to the ASIC will be also adjustable externally so that the user can make a trade-off between low-power and low noise.
15. The linearity of the ASIC and the front end noise will be improved significantly.
16. Internal comparator threshold DAC on each channel so that the threshold levels can be independently adjustable.
17. A register will give out address of all the channels that has a hit. This will allow hardware and software control of the readout scheme such as the near neighbor readout for a pixel detector to account for charge sharing between pixels.
18. Design a second "overload" comparator. This is again specifically implemented for astrophysics applications. It is set to a high threshold value. When the output of this comparator goes high then the external circuit will be flagged indicating that there was a hit from a large cosmic ray particle and the readout electronics are shut down by a preset time to allow the detector and the instrument to recover from this large overload event.
19. A trigger pulse output signaling that there is an event recorded in the ASIC.
20. A second fast and low jitter trigger output for timing purposes such as for detectors, which require coincidence timing.

21. Higher speed (relative to present RENA) of digital logic interfaces and also if possible of the analog output.
22. Increase Reset speed to reduce dead time due to resetting the ASIC.
23. Optimize the ASIC input to 2 and 9 pF detector capacitances. The input capacitor is also made easily optimizable for full wafer runs for a specific mission requirement.
24. Capture and readout of an individual analog timestamp for each channel, to allow for relative timing of hits on different channels to be measured.
25. Radiation tolerance >20 kRad (Si) and no destructive SEL. SEU is not a concern. This is achieved using standard CMOS technology with good design practice, no special rad-hard technology is used at this stage. If a mission requires a rad-hard technology than the design will be ported for rad-hard process for that mission's requirements.

Figure 12:
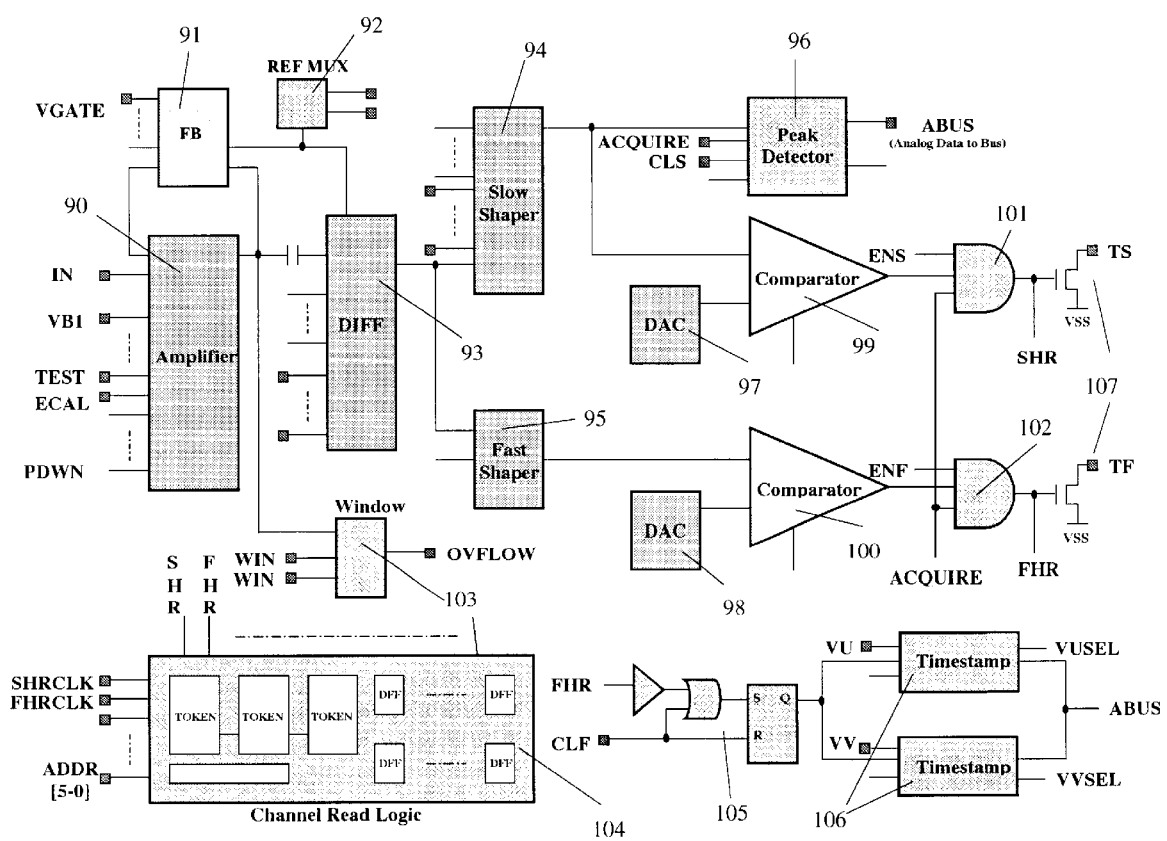
FIG. 12 is a single channel block diagram for the analog section of the RENA-2 integrated circuit.

FIG. 12 is showing a single channel block diagram for the analog section of the RENA-2 integrated circuit in more detail then the FIG. 1. Input IN, test input TEST, energy calibration input ECAL and power down input PDWN enters the input charge sensitive amplifier 90. The input amplifier has a feedback circuit 91. VGATE input enters feedback circuit 91. Feedback circuit's 91 output goes to reference multiplexer 92 and differentiator 93. Output of the input amplifier 90 also comes to differentiator 93 and Window 103 which includes the pole zero circuit. Output of differentiator goes to the slow shaper 94 and fast shaper 95. Output of the slow shaper 94 goes to the peak detector 96 and also to comparator 99. Peak detect have other inputs, acquire ACQUIRE and clear CLS signals also go into the peak detector 96. Output of the peak detector 96 goes to the analog data bus ABUS.

The threshold input of comparator 99 is supplied by digital to analog converter DAC 97. Output of comparator 99 goes to a gate 101 which is controlled by the acquire ACQUIRE and enable slow ENS signals. Output of gate 101 goes to slow trigger TS output 107. Output of the fast shaper 95 goes to comparator 100. The threshold input of comparator 100 is supplied by digital to analog converter DAC 98. Output of comparator 100 goes to a gate 102 which is controlled by the acquire ACQUIRE and enable fast ENF signals. Output of gate 102 goes to fast trigger TF output 107.

The gated 102 output of comparator 100 FHR comes to the time difference measurement circuit or time stamp circuit 105 and 106. Fast clear signal CLF also comes to the time difference measurement circuit. Time difference measurement circuit measures the arrival time difference of the events at each channel with respect to each other. Channel readout logic 104 controls the chip.

The input amplifier has been designed to be tolerant of DC leakage current so that detectors may be DC coupled to the chip. Four extra channels have been added to the standard 32 to allow connection of the detector cathode side to the same ASIC. A pole-zero cancellation circuit has been included to handle higher count rates without significant pileup errors. Heeding two important requirements for space deployment, the chip power consumption has been made adjustable by limiting the current flow to the input transistor and a sound level of radiation hardness will be ensured by use of a submicron CMOS process to fabricate the ASIC. The functionality of the new ASIC will also be significantly enhanced with an interface made simpler by a reduced pin count. Lastly, while three readout modes (sparse, neighbor, and global) are provided in the present RENA chip, the readout pattern in the new ASIC can be arbitrarily related to the hit pattern, under the control of external logic. Sparse readout (channels are read if and only if they are hit) will be the default).

As explained in the previous report, the feedback element of the RENA-2 is a resistive multiplier circuit which behaves like a simple 200 MΩ resistor, and provides continuous feedback. A simple long FET biased appropriately for use as the feedback element should give a noise performance approaching that of an ideal resistor and improve the linearity of the input amplifier. The resistive multiplier design at the time of the last report, however, generated significantly more noise than the few percent from a simple resistor. Since then, after much study, the following improvements were worked into the design: i) the source of excess noise in the previous resistive multiplier circuit was identified (a constant current drain) and eliminated; and, ii) the option, (channel selectable), of a more conventional MOSFET feedback circuit was introduced into the channel design. The MOSFET feedback can be enabled while at the same time disabling the resistive multiplier circuit by using a signal, which can be programmed on a channel-by-channel basis. Also, a per channel selection circuit to enable/disable the pole-zero circuit has been added. Much more recently, to accommodate the 40 μs peaking time requirement for both feedback circuit selections, a further option of a larger 1.2 GΩ resistive multiplier circuit was added.

The shaper design in RENA-2 was updated relative to that of the present RENA from a second-order "semigaussian" response to a fourth-order "semigaussian" response (4 pole gm-C filter). Basically the idea is to have a filter response which produces, for a given peaking time, the flattest top and the quickest return to within a small delta (say 1%) of the baseline. The initial design was to allow for a continuous range of shaper peaking times. However, in the process of the redesign, an unacceptable noise contribution from the shaper circuit was found, especially for the long shaping times. A thorough analysis revealed a nonlinearity intrinsic to the circuit that causes greater noise for larger pulse sizes (the dynamic range "nonlinearity problem" of the old RENA). An alternative shaper circuit, which is lower-noise because it allows more gain in the preamp stage, was then adapted. The new design however does not allow for a continuous range of shaper peaking times. Switches were then put in place to enable digital control of 16 different shaping times (independently on each channel). This relatively straightforward scheme works well for the smaller shaping times. Much design effort was made to approach the desired maximum 40 μs peaking time by using large resistors and capacitors. As implemented, incorporation of these elements led to an increase of the channel length by roughly 1.3 mm (the channel width is now=130 μm). As stated in Table III, the sixteen selections for the peaking time thus achieved are: 0.36, 0.39, 0.41, 0.45, 0.49, 0.54, 0.59, 0.66, 0.91, 1.08, 1.27, 1.69, 1.82, 2.80, 4.46, 38.0 μ. The values are located at approximate log spacings. The 40 μs peaking time selection was added at the expense of die area (a large 800 KOhm resistor was added to make this possible). Table III gives the mapping between selection number and peaking time. Although many of the selections lie in the low shaping time area, this provides at least 8 useful shaping times located on an approximate log curve. Extra shaping times may be ignored if desired.

Inputs are provided for two user-provided analog signals ($V_U$ and $V_V$ in FIG. 1) whose momentary values will be stored for readout in channel-specific sample-and-hold circuits whenever the respective channel's trigger comparator fires. The known time dependence of these external signals, which can be optimized for the specific application, can then be used to reconstruct the actual timing information. Examples of suitable external signals include sinusoidal wave forms, with a 90° phase difference to resolve ambiguities, or linear ramps that are initiated by the first channel trigger for any given event. To take full advantage of this new feature, we added to the signal path a second, fast shaper optimized for timing rather than energy resolution and use this shaper to generate the trigger signal.

The fast signal path was implemented with a second order shaper (2 pole gm-C filter) and fixed peaking time (150 ns). The fast-path uses two differentiations so that pole/zero cancellation errors do not cause a baseline shift on the fast path. The channel trigger is taken either from the slow or fast path as set by a control bit. Ideally, when timing is important, the trigger will be from the fast path; when low-threshold operation is important, trigger will be from the slow path.

The fast trigger should be connected to the readout to assure avoidance of events where the fast channel data, i.e., the timestamp, is present but where that data is in fact from a prior event, or where the fast channel did not trigger, in which case the timestamp data is invalid. The requirements are, at a minimum, for the triggering scheme to allow for channel triggering at least on the slow channel, to mark each channel as being hit or not in the fast channel (and thus having or not having valid timing data), and to allow for independent signaling to the controller (e.g., the FPGA) of the OR of the slow triggers and of the OR of the fast triggers. Hence, the controller can abort and clear any events, which, for instance, had fast-only data that would otherwise potentially contaminate the data for some following event.

To accomplish the above, the scheme adopted in the design includes a second Hit/Read register: there are now two, the slow (SHR) register and the fast (FHR) register (see FIG. 1). The controller then has complete flexibility to use peak height data only, peak height and timing, or timing data only, and in the case of using peak height and timing, can enforce that the data validly comes from a single event (within reason of course—two events closely separated in time, i.e., <peaking time, can always contaminate each other).

The RENA chip offers the user some flexibility by providing a variety of readout modes—sparse, nearest neighbor, and global readout. The nearest neighbor mode is quite useful to account for charge sharing in strip detectors or other essentially one-dimensional detector arrays. However, its successful application requires a monotonic mapping of detector strips to RENA channels, which is not always optimal from the point of view of interconnect capacitance or mechanical constraints. In addition, extension of the nearest neighbor mode to two-dimensional arrays, though equally desirable, is not very practical, simply because there is no "natural" mapping from the four (or six, for a hexagonal detector array) nearest neighbors of a given pixel to the sequence of channels on the readout chip. In the new ASIC, the user is given the ability to specify which channels are to be read on a case-by-case basis. In this scenario, the readout pattern is controlled by a serial Hit/Read shift register with one bit per channel; if a bit is set, the corresponding channel is read out. Initially, when a channel triggers, the corresponding bit in the readout register is set. Before reading out the detector data, the control logic can then inspect the trigger pattern and, if necessary, replace it with a different readout pattern. This operation can be completed in 2.3 $\mu$s, regardless of the total system channel count, with a suitably designed external controller FPGA; it need not significantly compromise the deadtime specification. The readout pattern can be a nearest neighbor pattern customized to the particular experiment setup. The sparse readout mode is the default.

Other features implemented in the logic section are timestamp readout, with an option to disable it, and the configuration registers. The configuration of the new ASIC is done with the use of three signals—CS, CShift, Cin, and a 32 bit shift register whose bits are designated for programming functions in each channel.

The channel configuration is performed by loading in a 32 bit word of data into the serial shift register. These words are divided into address and digital configuration data OR address, and global configuration data. 16 of the 32 bits are for the DACs, 4 are for the shaping time, and the remaining 12 are the miscellaneous functions that the channel can perform. When the readout is performed, selected channels will send analog peak detection data, and time stamp data (if enabled) in succession until all channels have been read. Multiple chips may be tied together with this function efficiently. Pin count was minimized and the readout speed kept fast within reason. A deadtime of <(5 us+N*(330 ns)) for an N-hit event (N typically from 1 to 10 depending on application details) is expected.

The pole-zero circuit enable/disable selection per channel allows for the pole-zero circuit to be disabled for operation at low hit rates. This can help reduce noise slightly, and also removes the DC leakage component from the signal in later stages of the channel.

Two separate, selectable reference levels per channel have been provided, to allow for optimum biasing of the circuit both with the positive and with the negative input signals.

The chip output driver is designed to drive an AD92XX type A/D converter. The driver to connect several RENA chips with little circuitry to AD9240 or equivalent ADC has been designed. The peak detector design has been improved by reducing the complexity from the RENA chip. Detection of positive and negative peak signals is now possible.

Noise Performance

The initial aim for input-referred noise values were approximately 18 aC (112 e) rms in the 9 fC signal range and 45 aC (280 e) rms in the 53 fC range, for dynamic ranges of 500 and 1200, respectively. With 1 pF detector capacitance we expect to achieve possibly 35 aC (220 e) rms. In the new ASIC resistive feedback around the input amplifier should improve its tolerance of DC input current; use of a DAC on each channel to set the threshold should also remedy the effect of baseline differences.

Count Rate

The performance of the input amplifier was evaluated at high rates. Using the pole-zero cancellation circuits, count rates as high as 100 kHz can be obtained. However this is limited by the maximum input DC current specification of 5 nA since at high count rates, signal charge cannot be easily rejected by the amplifier/feedback Monte Carlo simulations confirm that the pole-zero cancellation can reject more than 99% of the previous signal at these high hit rates.

Radiation Hardness

The layout is being carried out employing techniques proven to enhance radiation hardness of the ASIC, e.g., maximizing substrate contacts and providing transistors with guard rings. This in conjunction with properties inherent to the 0.5 $\mu$m process to be used for fabrication should ensure meeting the >20 krad radiation performance requirement.

Power Consumption

The major part of the power is consumed in the input transistor, where a large current is essential for the low noise. Throughout the rest of the analog and digital circuits, where lowering the power consumption will not effect the noise performance of the chip, circuits were developed with lowest possible power consumption for the selected fabrication process. Notably, one of the amplifier designs was found to generate excess noise and was replaced by a circuit that was both low power and low noise. Channel power down available on a per channel basis. As stated in Table II, for a 1 kHz, single-hit event rate, the current estimate for the power consumption is 6 mW/ch with fast trigger path disabled. Disabled channels dissipate <0.5 mW each. We could clearly reduce power in the Diff buffer, the Shaper and the Fast shaper. However, with the fast path disabled, we will dissipate about 4.7 mW per channel. This does not include power dissipation in other external circuits.

Table 4 lists the specifications for the RENA-2 chip. These specifications are important in designing, fabricating and testing the RENA-2 chip. Table 5 lists the additional features of the RENA-2 ASIC.

TABLE 5

Additional features and capabilities of the RENA-2 integrated circuit

1. Low-noise continuous resistive feedback in lieu of switched reset approach to improve deadtime performance, thus allowing for operation at moderate rates, up to 5 kHz/ch on all channels with single-hit events.
2. Dummy channel structures (but no power) at each end of the array, to maintain uniformity
3. Selectable signal polarity on a channel-by-channel basis
4. Ability to wire several (at least up to 8) chips with simple scheme to a single controller (realized in an FPGA with 30 or preferably fewer I/O signals) and A/D converter, with no additional buffers or glue logic required (except level translators for the critical signals which do not use CMOS levels).
5. Test signal input bussed to all channels, individual enable switch at each channel to connect test signal bus to input of channel via a small capacitor.
6. Generalization of the "neighbor" readout mode using high-speed hit/read register to send hit pattern to and receive read pattern from external controller (FPGA). Sparse mode to work by default if no manipulation of the hit/read register is made during readout.
7. Internal threshold DAC on each channel. A single external reference voltage input sets the maximum threshold level, and an individual DAC at each channel sets the trigger threshold above the baseline by an amount equal to (DAC code/max)*(reference input).
8. Front-end saturation detection comparator to sense large overload signals. A window comparator has been included and this circuit will respond when the input amplifier is saturated either high or low.
9. Shaper filter to have a fast and a slow signal path. The fast signal will be fed to the trigger/timing comparator, the slow signal to the peak detector for pulse amplitude measurement.
10. Differential analog output (with disable) to allow direct connection between one or more new ASICs and AD92xx or similar type A/D converters with only passive filter network.
11. Higher speed (relative to RENA) of digital logic interfaces and the analog output. Max readout rate is 3Msps for analog samples. 20 MHz clock for digital hit/read shift register.
12. Capture and readout of an individual analog timestamp for each channel, to allow for relative timing of hits on different channels to be measured. Maximum spread in hit times between initial and final hits of a good event will be <1 $\mu$s. Timing precision (after suitable time walk correction offline) should be 20–30 ns FWHM..
13. Power dissipation reducible through use of two power down bits for each channel, one for the entire channel, another for the fast shaper.
14. Adjustable power to input amplifier (external bias control). This is provided to allow the user to make the critical tradeoff of power dissipation versus channel noise.

TABLE 4

New ASIC Specifications
Table 4 RENA-II Specifications. Some items refer to FIG. 1 found after the table.

| No. | Specification | Conditions | Min | Typ | Max | Comments |
|---|---|---|---|---|---|---|
| 1 | Full scale signal range | Range A, see FIG. 1 | 9 fC (250 keV for CZT) | | | Selection on a channel-by-channel basis of one of two full scale signal ranges. This minimum FSR must be achieved in all good parts, despite absolute capacitance tolerance for fabrication process. |
| 2 | Full scale signal range | Range B, see FIG. 1 | 54 fC (1.5 MeV for CZT) | | | |
| 3 | Allowable DC input current | Positive polarity, see FIG. 1 | −100 pA | | 5 nA | Small reverse input currents can occur in AC coupled systems, due to protection diode or coupling capacitor leakage. |
| 4 | | Negative polarity, see FIG. 1 | −5 nA | | 100 pA | |
| 5 | $\sigma_{inp}$ (total rms noise and error, input referred) | Range A, Cap-opt A, $C_d$ = 2 pF, see FIG. 1 | | | 18 aC | This is equivalent to 112 electrons, a dynamic range of 500. |
| 6 | | Range A, Cap-opt B, $C_d$ = 9 pF, see FIG. 1 | | | 18 aC | |

TABLE 4-continued

New ASIC Specifications
Table 4 RENA-II Specifications. Some items refer to FIG. 1 found after the table.

| No. | Specification | Conditions | Min | Typ | Max | Comments |
|---|---|---|---|---|---|---|
| 7 |  | Range B, Cap-opt A, $C_d = 2$ pF, see FIG. 1 |  |  | 54 aC | This is equivalent to 337 electrons, a dynamic range of 1000. |
| 8 |  | Range B, Cap-opt B, $C_d = 9$ pF, see FIG. 1 |  |  | 54 aC |  |
| 9 | $\partial\sigma_{inp}/\partial C_d$ | Range A, Cap-opt A, $C_d = 2$ pF, see FIG. 1 |  | TBD |  | Selectable (on a channel-by-channel basis) noise optimization by changing the input transistor width using a control bit. Optimized for two capacitance input values. |
| 10 |  | Range A, Cap-opt B, $C_d = 9$ pF, see FIG. 1 |  | TBD |  |  |
| 11 |  | Range B, Cap-opt A, $C_d = 2$ pF, see FIG. 1 |  | TBD |  |  |
| 12 |  | Range, B, Cap-opt B, $C_d = 9$ pF, see FIG. 1 |  | TBD |  |  |
| 13 | Minimum operating trigger | Range A, see FIG. 1 |  |  | 100 aC | This is equivalent to 624 electrons. |
| 14 | threshold requirement (applies to all channels simultaneously) | Range B, see FIG. 1 |  |  | 580 aC | This is equivalent to 3620 electrons. |
| 15 | Test signal coupling capacitance |  |  | 75 fF |  | This implies that a 707 mV step will inject the full scale (range B) signal of 53 fC |
| 16 | Number of active channels |  | 36 |  |  | In addition, a dummy channel for matching is at each end of array. |
| 17 | Peaking time constant | 16 selections 0–15 |  | 0.36, 0.39, 0.41, 0.45, 0.49, 0.54, 0.59, 0.66, 0.91, 1.08, 1.27, 1.69, 1.82, 2.80, 4.46, 38.0 µs nominal |  | 16 selections available on a channel by channel basis |
| 18 | Power dissipation | Event rate 1 kHz, single hits |  | 6 mW | TBD | Goal is 5 mW/ch, estimate 6 mW/ch with fast trigger path disabled. Channel power down available on a per channel basis. Off channels dissipate <0.5 mW each. |
| 19 | Total dose (γ) tolerance | <50% failure |  | 20 kRad(Si) |  | SEU is not a concern. The radiation specs are goals to be attempted on a best effort basis with standard CMOS technology, no special process. |
| 20 | Destructive SEL | TBD |  |  | 0 |  |
| 21 | Timing jitter | See FIG. 1 |  |  | 10 ns (or better) | Note that this is for input pulses of fixed amplitude - it excludes time walk due to amplitude variation. |
| 22 | Discriminator threshold DAC number of bits |  |  | 8 |  |  |
| 23 | Discriminator threshold DAC DNL |  |  | 1 bit, guaranteed monotonic |  |  |
| 24 | Discriminator threshold DAC range |  |  | Determined by external voltage input, settable from 0 up to FS signal range |  |  |
|  | Synchronous CMOS interfaces |  |  |  |  |  |
| 25 | Cycle time requirement |  |  | 30 ns |  | Typical application system will use a direct connection to Xilinx Spartan-series FPGA (or similar) running at 32 MHz. |
| 26 | Setup time requirement |  |  | 12 ns |  |  |
| 27 | Hold time requirement |  |  | 0 ns |  |  |
| 28 | Data valid time |  |  | 10 ns |  |  |
| 29 | EMI-critical signal standards |  |  | LVDS or low-swing (150 mV) version |  | Applies only to TRIG, RST, and ACQUIRE signals (all asynchronous) |
| 30 | Analog output architecture |  |  | Differential out with disable, to drive capacitive load only; 4 or more RENA 2000 bussed together to single A/D |  |  |
| 31 | Analog output settling time | $C_L$ = TBD, 12-bit settling |  |  | TBD | Goal is 333 ns |
| 32 | Analog output format |  |  | For each channel marked in the read register, peak detector level and (if enabled) U and V timestamp levels |  |  |
| 33 | Dead time per event | Event with n channels to read: HIT/READ register is read and written | TBD | TBD | TBD | Goal is 5 µs + ns * (333 ns) |
| 34 | input pad pitch |  |  | 125 µm |  |  |

What is claimed is:

1. A data readout integrated circuit having a plurality of integrated circuit channels comprising a plurality of inputs coupled to a plurality of detectors, wherein the plurality of inputs are coupled to plurality of input amplifiers, for providing a plurality of readout signals amplified from a plurality of detector signals, wherein each input amplifier is part of a readout channel wherein each readout channel comprises:

a means for receiving a detector signal;
a charge sensitive amplifier coupled to said means for receiving a detector signal, for integrating said detector signal and producing a signal output;
at least one shaper amplifier responsive to said charge sensitive amplifier signal output;
a processing circuit connected to the shaper amplifier for processing a charge sensitive amplifier output to generate readout signals, and a means for outputting said readout signals responsive to said detector signals.

2. The data readout integrated circuit of claim 1, wherein a polarity switching circuit is included.

3. The data readout integrated circuit of claim 2, wherein said polarity switching circuit is externally controlled.

4. The data readout integrated circuit of claim 1, further comprising a gain stage coupled to said charge sensitive amplifier.

5. The data readout integrated circuit of claim 1, wherein said shaped, integrated detector signal is of an approximately inverted bell shaped form.

6. The data readout integrated circuit of claim 1, wherein said shaped, integrated detector signal is of an approximate uninverted bell shaped form.

7. The data readout integrated circuit of claim 1, further comprising a peak hold circuit coupled to output of shaper amplifier, wherein peak hold circuit have output which is coupled to a first plurality of comparators.

8. The data readout integrated circuit of claim 7, wherein a first comparator of said plurality of comparators is a low level discriminator, and wherein at least one of said first comparator allows an output trigger when a peak hold circuit output is larger than a first threshold voltage.

9. The data readout integrated circuit of claim 8, further comprising a second comparator of said plurality of comparators wherein said second comparator is an upper level discriminator, and wherein said second comparator only issues a signal when said peak hold circuit output is larger than a second threshold voltage.

10. The data readout integrated circuit of claim 9, wherein said first comparator and said second plurality of comparator enclose at least one predetermined energy band.

11. The data readout integrated circuit of claim 9, further comprising a differentiator circuit coupled to at least one of said first plurality of comparators, said differentiator circuit producing a fast trigger output with low jitter.

12. The data readout integrated circuit of claim 7, wherein an output of said peak hold circuit is multiplexed to said means for outputting.

13. The data readout integrated circuit of claim 9, wherein an output of at least one of said comparator or said second plurality of comparator initiates a readout cycle of said data readout integrated circuit.

14. The data readout integrated circuit of claim 1, wherein said means for outputting outputs a trigger signal for a channel of said plurality of integrated circuit channels containing a detected signal.

15. The data readout integrated circuit of claim 14, wherein said data outputting means only outputs said readout signal for said channel of said plurality of integrated circuit channels for which a trigger signal has been received.

16. The data readout integrated circuit of claim 14, wherein said data outputting means outputs said readout signal for said channel of said plurality of integrated circuit channels after said trigger signal has been received for any one of said plurality of integrated circuit channels.

17. The data readout integrated circuit of claim 16, wherein said trigger signal is an external trigger signal.

18. The data readout integrated circuit of claim 1, wherein a data outputting means outputs a readout signal for one triggered channel of said plurality of integrated circuit channels an disables all remaining channels of said plurality of integrated circuit channels, wherein a time delay between said readout signal and said disablement of said remaining channels is controlled by an externally supplied signal.

19. The data readout integrated circuit of claim 1, wherein said input charge sensitive amplifier has a resistive feedback in parallel to a capacitance feedback.

* * * * *